Oct. 15, 1957  V. A. HOOVER  2,809,736
MECHANICAL ACTUATOR
Filed April 14, 1953  5 Sheets-Sheet 1

INVENTOR.
VAINO A. HOOVER
BY
Fulwider, Mattingly & Babcock
Attorneys

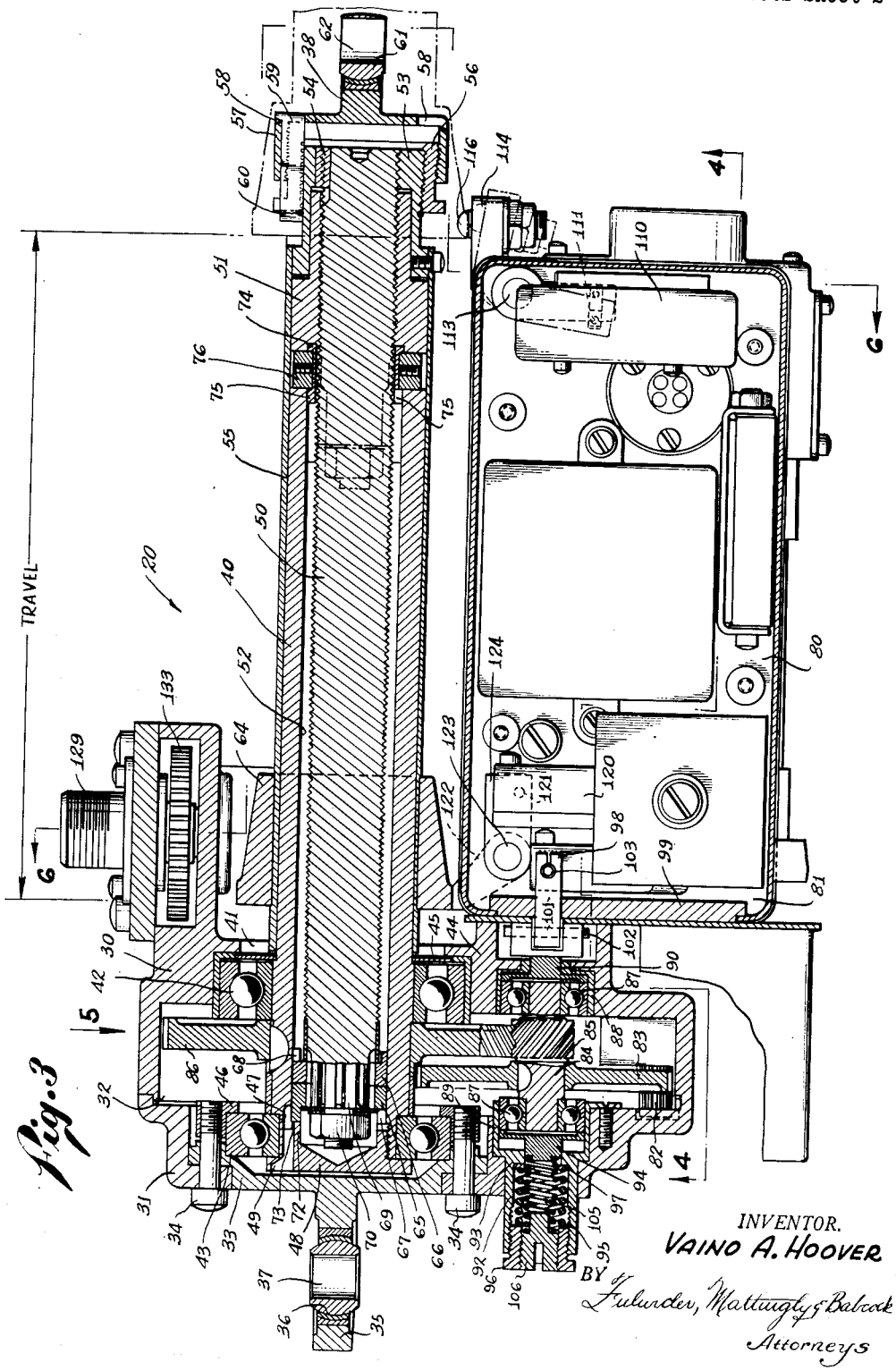

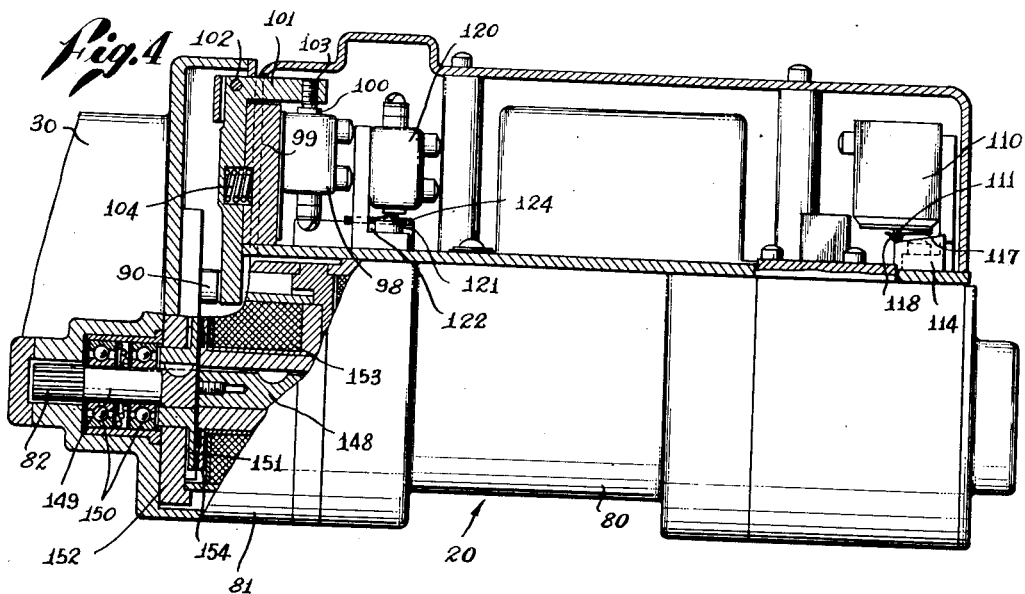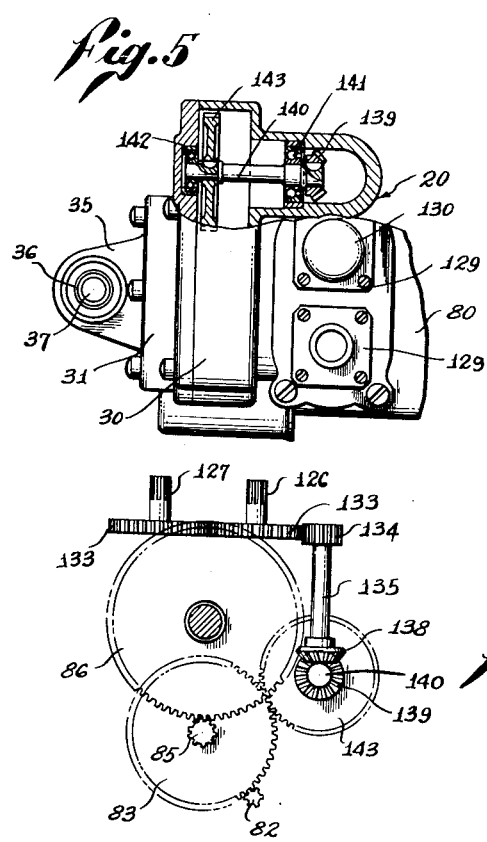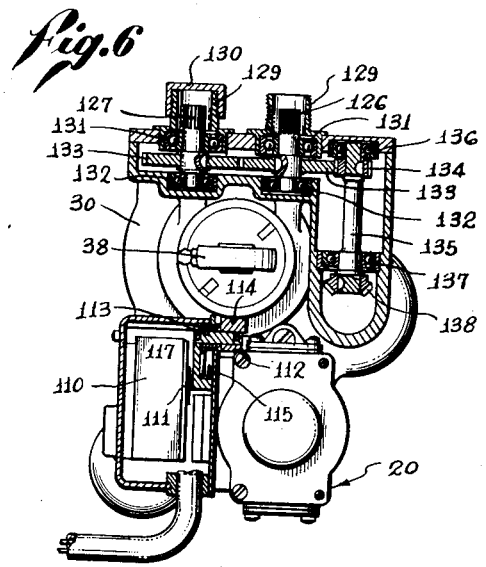

Oct. 15, 1957  V. A. HOOVER  2,809,736
MECHANICAL ACTUATOR
Filed April 14, 1953  5 Sheets-Sheet 4
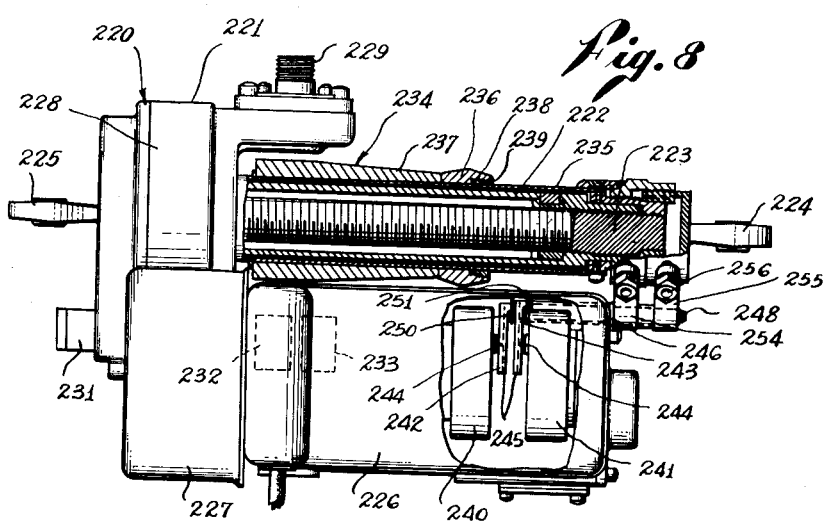
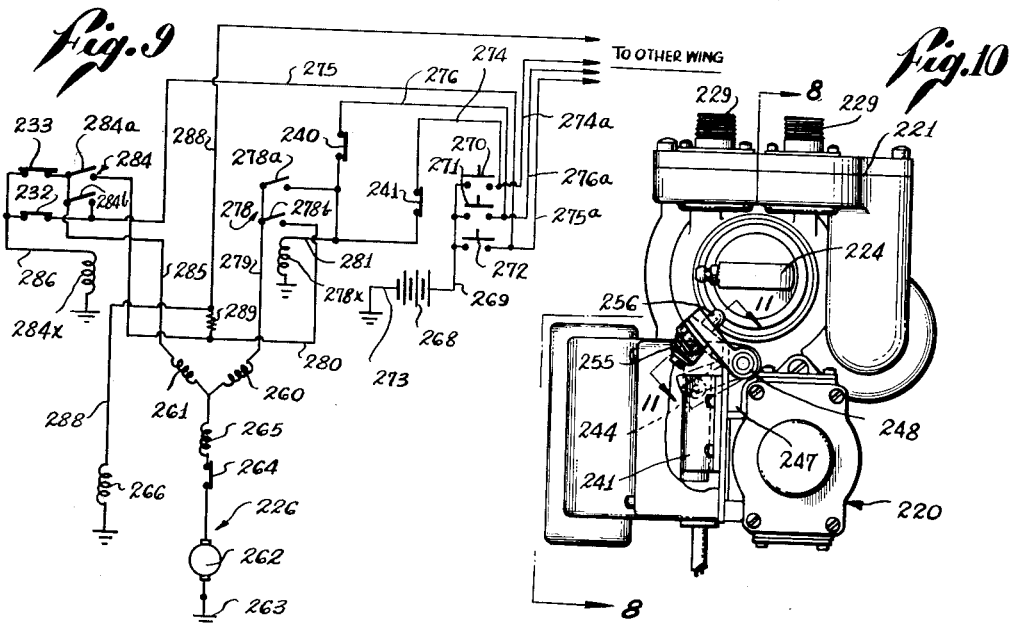
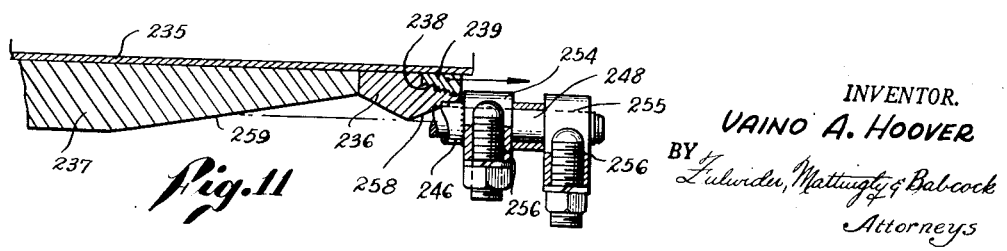
INVENTOR.
VAINO A. HOOVER
BY
Lulurder, Mattingly & Babcock
Attorneys

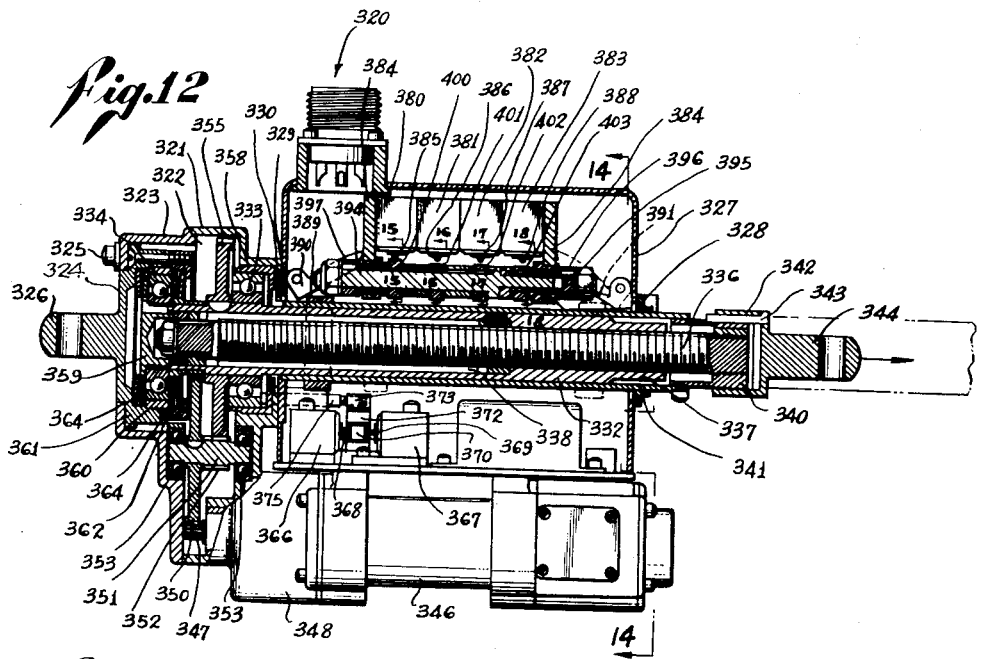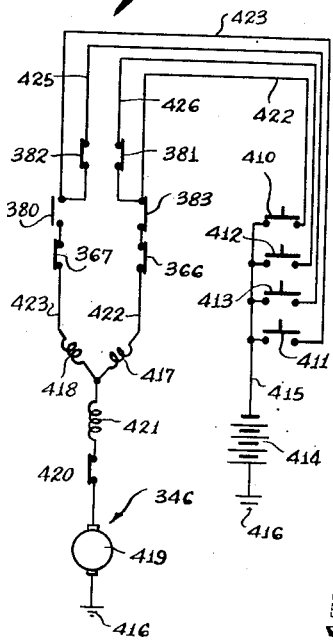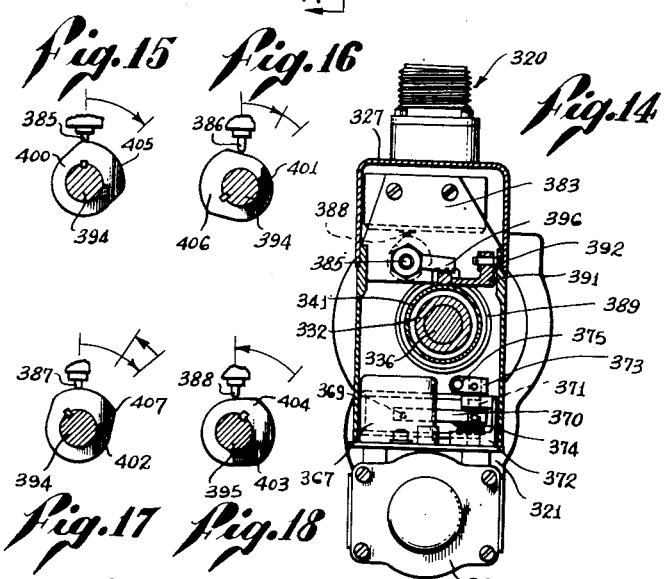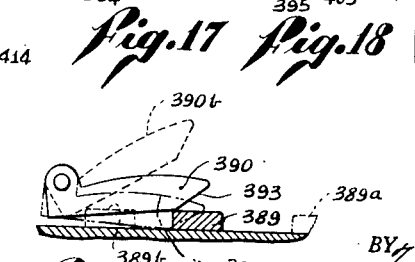

United States Patent Office 2,809,736
Patented Oct. 15, 1957

2,809,736

MECHANICAL ACTUATOR

Vaino A. Hoover, Los Angeles, Calif.

Application April 14, 1953, Serial No. 348,741

9 Claims. (Cl. 192—143)

My invention relates generally to mechanical actuators, and more particularly to an improved linear actuator of the general type shown in my Patent No. 2,590,251, issued March 25, 1952, for Mechanical Actuator.

This type of actuator uses an electric motor to rotate one member of a cooperating nut and screw assembly, for providing relative longitudinal movement. The actuator can develop a relatively great linear thrust force, and is very advantageous for use in the remote positioning of various devices since it may be connected to the control station by simple electrical circuits. Because of their compact size and light weight, such actuators are used frequently in aircraft for the remote positioning of control surfaces, canopies, doors, and the like, which are controlled from the cockpit of the plane.

In many of these installations it is important that the actuated part be precisely positioned in a fully retracted or extended position. For example, wing flaps which are extended during take-offs and landings should be retracted fully during the flight of the plane in order that the wings present the proper air foil shape. Electrical limit switches are not sufficiently accurate to insure such a positive retraction, and it is therefore desirable that the movable member of the actuator be driven against a positive mechanical stop and held in this position.

In my aforesaid patent there is disclosed a form of non-jamming mechanical limit stops which can be accurately set to determine a precise retracted or extended position. A feature of the present invention is the provision of means for driving the movable member directly against a mechanical stop by the use of a load-limiting switch which shuts off the current to the driving motor upon a torque overload caused by the direct physical engagement of the movable member against the stop. The control circuit also includes a load limit shorting switch which acts to prevent a torque overload from deenergizing the driving motor during the main portion of the travel of the movable member.

In other types of installations than that just described, it is important to limit the thrust applied to the actuated part to prevent mechanical damage to the mechanism or injury to personnel. For example, a canopy or door may have a load limit which should not be exceeded either during opening or closing. Another feature of the present invention is the provision of a simple load-limiting mechanism acting directly from the relatively movable part of the actuator to open load limit switches when a predetermined thrust load is reached either during extension or retraction.

It is also an object of my invention to provide secondary drive means for moving the actuator in the event of a motor failure within the unit. This is particularly concerned with installations wherein pairs of actuators are used for actuating right and left hand parts. Mechanical interconnecting means are provided for coupling the paired actuators together so that in the event of a motor failure of one unit, both actuators may be driven from the remaining motor.

In this connection it should be noted that the actuators have a magnetic clutch of the general type disclosed in my Patent No. 2,618,368 issued November 18, 1952, for Magnetic Clutch. Such a device includes a composite clutch and brake means for connecting the actuator drive with the motor shaft when the motor is energized, and connecting the drive to braking means when the motor is deenergized. Thus the actuator is positively held in a stopped position so that there can be no inadvertent movement of the device controlled by the actuator.

It is a further object of my invention to provide a control circuit having means for energizing the clutch and brake of one actuator from the motor circuit of a paired actuator so as to release the braking means of the first actuator despite a failure of that motor or the electrical supply associated therewith, thus permitting both actuators to be operated by the one motor of the other actuator.

An additional object of my invention is to provide an adjustable load limit switch mechanism having reset means to take up the lost motion or overtravel in the switch contacts.

Still another object of the invention is to provide an actuator of the class described having accurately adjustable means for determining limits of travel of the actuator.

A still further object of the invention is to provide an actuator which is simply and durably constructed to give dependable service.

These and other objects and advantages of the invention will become apparent from the following detailed description of preferred and modified forms thereof, and from an inspection of the accompanying drawings, in which:

Fig. 3 is a longitudinal medial section through the preferred form of actuator;

Fig. 4 is an upwardly-directed view partially in section taken along the line 4—4 of Fig. 3;

Fig. 5 is a plan view partially in section taken in the direction of the arrow 5 of Fig. 3;

Fig. 6 is a cross-section taken along the line 6—6 of Fig. 3;

Fig. 7 is a schematic detail of the actuator and cross shaft drive means in the preferred actuator;

Fig. 8 is a side elevation partially in section of a modified form of wing flap actuator taken along the line 8—8 of Fig. 10;

Fig. 9 is a partial wiring diagram of the electrical control circuit for a pair of modified actuators;

Fig. 10 is an end elevation of the modified actuator;

Fig. 11 is an enlarged detail of the ring cam and limit switch operators taken along the line 11—11 of Fig. 10;

Fig. 12 is a longitudinal medial section taken through another form of actuator for use in moving a canopy or the like;

Fig. 13 is a wiring diagram of the electrical control circuit for the canopy actuator;

Fig. 14 is a cross-section through the canopy actuator taken along the line 14—14 of Fig. 12;

Figs. 15 through 18 are cross-sectional details of the switch-operating cams taken along the lines 15—15 to 18—18, respectively, in Fig. 12; and Fig. 19 is a detail of the left hand cam follower and ring cam shown in Fig. 12.

Figure 1:
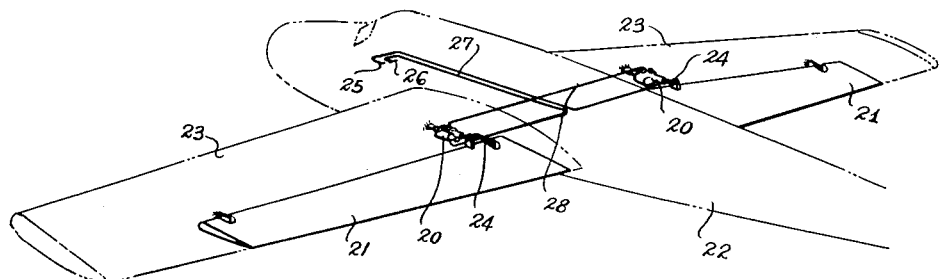
Fig. 1 is a schematic view of an airplane showing a pair of wing flap actuators installed therein and mechanically and electrically interconnected.

Referring now to the drawings, and particularly to Fig. 1 thereof, a preferred form of actuator 20 is shown installed for moving wing flaps 21 of a typical aircraft 22. Flaps 21 are movable pivotally from the normally retracted position in which they are aligned with the trailing edges of wings 23, to a downwardly-inclined extended position. In order to move flaps 21 I provide a pair of actuators 20 mounted in the structure of wings 23 and connected, one to each of the flaps, by suitable linkages 24. The arrangement is such that linear extension of each actuator 20 will cause downward movement of the connected flap 21, and retraction of the actuators brings the flaps upwardly to the normal position.

Mounted in the cockpit of the airplane 22, or at other suitable control station, are normally open "extend" and "retract" control switches 25 and 26, respectively, which are interconnected with both of the actuators 20 by an electrical control circuit 27. Upon closing of the "extend" switch 25, both of the flaps 21 are simultaneously lowered, and upon closing of "retract" switch 26 both of the flaps are simultaneously retracted. It should also be noted that actuators 20 are cross-connected by a shaft 28 in the form of a flexible rotatable cable to provide a mechanical interlock, as will later be described.

As is best seen in Fig. 3, the actuator 20 includes a housing 30 of generally circular shape. At one end of housing 30 is secured a flanged cover 31 which closes an inner chamber 32. In the upper portion of cover 31 a plate 33 is removably secured by fastening means such as bolts 34, and projecting outwardly from the plate is an ear 35 fitted with a spherical bearing 36 which is transversely bored as shown at 37. The ear 35 and bearing 36 provide a self-aligning means for connecting the housing 30 to suitable supporting structure. A similar ear 38 projecting outwardly from the opposite end of the housing is relatively movable and provides a self-aligning means for connection to the linkage 24.

An elongated tubular nut 40 is extended outwardly from housing 30 through an end opening 41 opposite plate 33, and is rotatably supported in the housing by a main ball bearing 42 and a smaller ball thrust bearing 43. The outer race of bearing 42 is fitted within a shouldered seat 44 formed adjacent housing opening 41, while the inner race is fitted on nut 40. If desired, a grease seal 45 may be placed between opening 41 and bearing 42. The outer race of thrust bearing 43 is held between plate 33 and a lock ring 46 which is removably secured to the plate by bolts 34, and the inner race is seated within a reduced seat 47 formed at the end of nut 40. A flanged cap 48 is internally threaded within the end of nut 40 and locked in place by a key 49 to hold the inner race of bearing 43 firmly within seat 47. Thus nut 40 is journaled for rotation while being held against axial movement relative to housing 30.

Extending coaxially within nut 40 is an elongated externally threaded screw 50 which is threadedly engaged with an internally threaded outer end portion 51 formed on the nut. The remaining interior portion of nut 40 is of enlarged diameter forming a cylindrical smooth-walled bore 52 which has substantial clearance with screw 50. At the extreme outer end of screw 50 a sleeve 53 is threadedly engaged thereon and is locked against rotation by a key 54. The inner end portion of sleeve 53 is secured to a thin-walled tubular cover 55 which slidably covers nut 40, and the outer end portion of sleeve 53 is externally threaded to take an adjustment nut 56 which in turn carries a head 57. Formed integrally with the outer end of head 57 is the previously-mentioned relatively movable ear 38.

Head 57 is threadedly engaged on nut 56 by threads of different lead than those between the nut and sleeve 53, to provide for a vernier adjustment of the position of the head relative to screw 50. The end wall of head 57 has diametrically opposed slots 58 therein adapted to receive a key 59 for locking the head relative to nut 56. A locking wire 60 may be passed through key 59 to prevent any change in the adjustment, once set. Ear 38 is fitted with a spherical bearing 61 which is bored as shown at 62 to provide a self-aligning connection of the ear 38 to linkage 24.

The nature of linkage 24 is such as to prevent rotation of ear 38 about the axis of the screw 50, so that screw 50 is held against rotation although it is free to move longitudinally. Rotation of nut 40 therefore causes screw 50 to extend or retract relative to housing 30 and the fixed securing ear 35. As screw 50 is extended, cover 55 moves outwardly relative to nut 40, so that the extended portion of the screw is always covered and protected. Near the inner end of cover 55 a ring cam 64 is affixed for movement with thre cover. Cam 64 operates the electrical limit switches of the device, as will later be described.

The mechanical limits of travel of screw 50 are determined by stops which are of the non-jamming type disclosed in my aforementioned Patent No. 2,590,251. Reference is made to said patent for the detailed construction and advantages of this form of limit stop. Briefly described, inner and outer stop jaw members 65 and 66 having opposed pairs of end dogs 67 and 68, respectively, are mounted on a reduced splined end 69 formed at the inner end of screw 50. Jaw members 65 and 66 are fixed non-rotatably on splined end 69, and are held against axial movement by a lock nut 70. The outer diameter of jaw members 65 and 66 corresponds to that of nut bore 52 so as to seat slidably and rotatably thereagainst. When screw 50 is fully retracted, the inner end stop jaw 65 is adapted to bear against a complemental jaw 72 formed on the end of nut cap 48 to bring dogs 67 into interlocking engagement with matching dogs 73. Since screw 50 is held against rotation, and cap 48 is fixed for rotation with nut 40, it can be appreciated that when jaw 72 engages jaw 65, the nut 40 is immediately stopped and held against further rotation. This determines the retracted or inner limit of travel of screw 50 at an exact position.

At the outer end of nut bore 52 is a jaw 74 formed complemental to the outer stop jaw 66 and having dogs 75 for matching engagement with dogs 68. Jaw 74 is fixed for rotation with nut 40 by adjustable key means 76, and is internally smooth-walled to pass slidably over screw 50. When screw 50 has been fully extended, stop jaw 66 bears against jaw 74 in interlocking engagement and positively prevents further rotation of nut 40. This precisely determines the extended or outer limit of travel of screw 50 and corresponds to the position in which flaps 21 are fully extended.

In order to rotate nut 40 for extension and retraction of screw 50, I provide a reversible electric motor 80 which is attached to the lower portion of housing 30. The shaft of motor 80 is connected through a magnetic clutch and brake unit 81 to a driving pinion 82 which is rotatably journaled in the bottom portion of housing chamber 32. The drive pinion 82 meshes with a spur gear 83 keyed to a shaft 84 which also has formed thereon a helical pinion 85. Keyed to nut 40 is a helical gear 86 which meshes with pinion 85, to complete a reduction gear train between drive pinion 82 and the nut 40.

Shaft 84 is rotatably journaled by bearings 87 which are mounted for limited axial sliding movement relative to opposed cup-like holders 88 and 89 secured within housing 30 and cover 31, respectively. Holder 88 is shouldered outwardly against housing 30 and has a reduced end portion forming a seat for a slidable headed pin 90 which is urged inwardly to bear against one end of shaft 84. Holder 89 is shouldered outwardly against cover 31, and is formed integrally with a reduced cylindrical body 92 which projects outwardly through the cover. The inner end of body 92 has a reduced seat 93 which slidably receives a headed pin 94 that is urged to bear inwardly against the other end of shaft 84.

Because of the inclination of the teeth of the helical pinion 85 and the helical gear 86, the pinion 85 tends to slide axially with respect to gear 86 during operation whenever the rotation of the gear 86 is resisted. This principle is utilized to provide a load-limiting mechanism which is operable to deenergize motor 80 when nut 40 is rotated in a retracting direction to engage the inner end mechanical stops as screw 50 reaches the fully retracted position. By the provision of this mechanism I am able to bring flaps 21 into a fully retracted position determined positively by the position of the mechanical stops. Since the position of flaps 21 has a considerable effect upon the flight characteristics of the aircraft, it is important that this accurate control of the retraction of the flaps 21 be made possible.

When motor 80 is energized to drive pinion 82 in a retracting direction of rotation, pinion 85 rotates gear 86 and nut 40 until stop 65 engages stop 73. Gear 86 is then held against further rotation and pinion 85 tends to slide axially to the left, as viewed in Fig. 3. Within body 92 is a spring 95 that is confined between an outer end screw 96 threadedly engaged with the body, and a washer 97 held against the reduced seat 93. The internal diameter of washer 97 is less than that of pin 94 so that as the latter moves outwardly it engages with the washer and acts to compress spring 95. By adjusting screw 96, the spring loading which pin 94 must overcome to move outwardly may be varied.

The pin 90 at the opposite end of shaft 84 is arranged to follow the movement of the shaft, and slides to the left in accordance with the movement of the shaft and the pinion 85. This action opens a load limit switch 98 which is mounted on motor 80, to deenergize the motor and stop the driving action of pinion 82. As may best be seen in Fig. 4, switch 98 is mounted rigidly to a wall 99 forming a portion of the motor housing, and is provided with an operating plunger 100 which is movable to open and close internal contacts. A bell crank 101 is pivotally mounted on a pivot pin 102 adjacent switch 98, and has one arm fitted with an adjustment screw 103 for engagement with plunger 100, and the other arm extending past wall 99 and abutting the outer end of pin 90. Between wall 99 and crank 101 is a spring 104 which urges the crank to pivot outwardly in a direction to bear against pin 90. When shaft 84 moves to the left, pin 90 is urged to follow the shaft by crank 101 which is moved pivotally by spring 104, and at the same time acts to depress plunger 100. Switch 98 is a normally closed switch and is opened upon depression of plunger 100.

Switch 98 is of a well-known type having spring contacts which move past center and then snap to an open or closed position. Because of the character of the switch, it has a certain amount of lost motion, or overtravel past center, which occurs before the spring contacts snap. To insure that switch 98 will be reset to the closed position immediately upon the release of the torque overload, I provide resetting means which drive pin 90 through a complete return stroke for releasing plunger 100, as soon as the torque load has dropped to a sufficiently low value. As is seen in Fig. 3, body 92 carries an inner reset coil spring 105 extending concentrically within the spring 95. The inner end of reset spring 105 bears against pin 94, while the outer end is engaged on a threaded plug 106 which is threadedly engaged within screw 96 and permits independent adjustment of the spring tension. Spring 105 normally urges pin 94 and shaft 84 to the right so as to hold crank 101 out of engagement with switch plunger 100.

As the torque load increases, spring 105 is compressed until pin 94 engages washer 97, at which point any further movement tends to compress the spring 95. Spring 105 is relatively weak while spring 95 is strong, and is preset to the maximum torque loading which is desired. As compression of spring 95 occurs, switch plunger 100 is depressed sufficiently to move the switch contacts past center to snap to the open position, deenergizing motor 80. When screw 50 is subsequently driven in an extending direction, it is desirable that switch 98 immediately be reset to the closed position. Since spring 95 is compressed only a short distance, the return travel thereof is not necessarily sufficient to release the plunger 100 to reset the switch contacts to closed position. However, when spring 95 has reached the end of its return travel, spring 105 continues to urge pin 94 to the right through enough further travel to reset plunger 100, and move the switch contacts to closed position.

In order to limit the outward travel of screw 50, I provide an outer or extend limit switch 110 which acts to deenergize motor 80 when the screw reaches a position just short of engaging the outer stop jaw 66 against stop 74. While under some conditions it might be desirable to drive screw 50 fully into the outer mechanical stop, this precision in the extended position of the screw is not required for the installation described, and limit switch 110 is set to open before the mechanical stops engage.

As is best seen in Figs. 4 and 6, switch 110 is mounted near the outer end of motor 80 and is provided with an operating plunger 111 which is movable inwardly to open internal contacts. A bracket 112 supports a bell crank 114 on a shaft 113. Both arms of crank 114 are pinned to shaft 113 and a coil spring 115 is wound around the shaft and secured to bracket 112 so as to urge the crank to pivot upwardly, in a counterclockwise direction as viewed in Fig. 3. The upper arm of crank 114 carries an adjustable engagement screw 116, and the lower arm is formed with a wedge-shaped cam surface 117 which is adapted to move pivotally in a plane lying at right angles to the axis of movement of switch plunger 111. The trailing surface of cam 117 is of increased thickness, and as it moves past plunger 111 it depresses the latter to open the internal contacts. To protect plunger 111 against side thrust, a leaf spring 118 may be secured to switch 110 and extended outwardly over the head of the plunger to absorb the side thrust imparted by cam 117.

Crank 114 lies in the path of ring cam 64 which moves outwardly with screw 50, so that as the screw approaches the outer end of its travel the rim of the cam lies in the position shown in phantom outline in Fig. 3, and pushes screw 116 downwardly to pivot crank 114 against spring 115 and depress plunger 111. As soon as screw 50 and cam 64 move inwardly, crank 114 pivots upwardly under the urging of spring 115 and plunger 111 is released. Switch 110 is a normally closed switch, and thus acts to deenergize motor 80 only when the outer limit of travel is reached.

With the arrangement thus far described, switch 98 operates to deenergize motor 80 when the inner limit of travel is reached, and switch 110 when the outer limit is reached. Since the action of switch 98 occurs upon a torque overload due to the engagement of the inner mechanical stops, it is desirable that another inner limit or shorting switch 120 be provided. Switch 120 is set to open only when screw 50 has closely approached the inner limit of travel, and its purpose is to prevent switch 98 from operating to deenergize motor 80 by reason of a torque overload during the major portion of the travel of the screw through the retracting stroke. In other words, the normally closed shorting switch 120 renders switch 98 ineffective to deenergize motor 80 at any time except when screw 50 has closely approached the inner limit of travel determined by the mechanical stops. The electrical circuit for this arrangement will later be described.

Switch 120 is mounted near the inner end of motor 80 and has an operating plunger 121, as may best be seen in Fig. 4. A bell crank 122 supported by a shaft 123 has an upper arm lying in the path of ring cam 64, and a lower arm which passes pivotally across the end of switch button 121. Crank 122 is pivotally urged upwardly by spring means (not shown), and is constructed similarly to the previously-described bell crank 114. The surface of the lower arm of crank 122 adjacent plunger 121 has a wedge-shaped cam surface 124 thereon formed with a trailing portion of increased thickness to depress the plunger when the crank is pivoted by engagement with cam 64. Depression of plunger 121 opens the normally closed internal contacts of switch 120, so as to render switch 98 effective to deenergize motor 80 upon further retraction of screw 50. Until crank 122 is depressed by engagement with cam 64, switch 120 is closed, and switch 98 is ineffective to deenergize motor 80 during substantially all of the retracting travel of screw 50.

It will be remembered that it is an object of the invention to mechanically couple both actuators 20 together so that the motor 80 of one actuator may drive both actuators in the event of a power failure in the other motor. In order to couple the actuators 20 in this manner, a pair of driving pinions 126 and 127 are mounted in the top of the housing 30 for connection with the previously-mentioned flexible shaft 28 which is extended between the actuators. Pinions 126 and 127 rotate in opposite directions, and either may be connected to shaft 28 so that the actuators 20 may be made identical without incurring any difficulty due to right and left hand installations.

As is best seen in Figs. 5, 6, and 7, pinions 126 and 127 are formed on the upper ends of stub shafts which project upwardly through receptacles 129 mounted on housing 30. A cap 130 threadedly engages one of the receptacles 129 to cover the pinion 126 or 127 which is not connected to shaft 28. Both pinions 126 and 127 are rotatably supported in housing 30 by sets of upper and lower bearings 131 and 132, respectively, and carry idler gears 133 which are intermeshed with each other. At the side of one of the gears 133 is a pinion 134 which is affixed to a shaft 135 that extends downwardly and is supported by upper and lower bearings 136 and 137, respectively. As can be seen, rotation of shaft 135 causes rotation of pinion 126 in one direction and rotation of pinion 127 in the other direction. By coupling shaft 28 to one or the other of the pinions, I thus insure that both actuators 20 may be connected together for simultaneous extension and retraction as desired.

On the lower end of shaft 135 is a miter gear 138 which meshes with a miter gear 139 lying at right angles thereto and affixed to a horizontally extending rotatable shaft 140. Shaft 140 is supported in housing 30 by end bearings 141 and 142 and has fixed thereon a spur gear 143 which meshes with the previously-described spur gear 83 carried on shaft 84. Since gear 83 is meshed with driving pinion 82, I have completed a gear chain from the motor drive pinion 82 to both of the external pinions 126 and 127. The complete drive gearing may best be seen followed in the diagrammatic view of Fig. 7.

By reason of the gearing just described, both actuators 20 are locked mechanically together and under normal conditions the motors 80 share the load of driving screws 50. When one motor 80 cannot be energized, the remaining motor 80 will drive both screws 50 so that the flaps 21 will always move together. When both motors 80 are deenergized it is desirable that both screws 50 be locked against inadvertent movement, and this requires that the drive gearing of the actuators 20 be locked against rotation.

As was previously mentioned, the drive pinions 82 are connected to motor 80 through magnetic clutch and brake units 81. The function of unit 81 is to connect pinion 82 to the motor drive shaft when motor 80 is energized, and to hold pinion 82 against rotation when the motor is deenergized. Unit 81 is of the type disclosed in my aforesaid Patent No. 2,618,368, and reference is made thereto for a complete description of the device. Briefly considered, the unit 81, as is seen in Fig. 4, has a drive shaft 148 which is an extension of the armature shaft of motor 80. Coaxially aligned with shaft 148 is a shaft 149 supported by bearings 150 and carrying on its outer end the drive pinion 82. Shaft 148 is axially movable and carries on its inner end a disk 151 which is normally urged against a stationary plate 152, so that the friction between the two acts as a brake to prevent rotation of pinion 82. When the clutch is to be engaged motor 80 is energized, and current passes through a clutch coil 153 that surrounds shaft 148. This causes shaft 149 and disk 151 to move axially toward shaft 148, the disk then being separated from the stationary plate 152 and engaging a driving disk 154 mounted upon and driven by shaft 148. When this occurs the frictional engagement between disks 151 and 154 causes these elements to rotate together, thereby turning pinion 82 with the motor shaft.

It can therefore be seen that pinion 82 is normally held against rotation, but is drivably engaged with motor 80 upon energization of the latter by energization at the same time of the clutch coil 153. When both motors 80 are energized there is, of course, no problem since both clutch coils 153 are energized and both pinions 82 are drivably engaged with their respective motors. However, when there is an electrical failure of one motor 80 or the electrical supply associated therewith, it is necessary to free the drive pinion 82 of that actuator 20, in order that the gearing connected thereto can be rotated by the mechanical cross-connection with the other actuator. For this reason it is necessary to provide an auxiliary clutch or brake releasing coil 155 which may be energized independently of the motor 80 of that actuator. Coil 155 is electrically connected to the motor 80 of the other actuator and is energized thereby. The strength of coil 155 is such as to release disk 151 from stationary plate 152, but is somewhat less than that of coil 153, so that disk 151 is not driven into tight frictional engagement with disk 154. Thus the pinion 82 is free from the stationary brake and is also free from engagement with the motor 80 that is not energized. Both screws 50 can therefore be driven from the remaining motor 80, and there is no drag caused by attempting to rotate the other motor. In Fig. 4, coils 153 and 155 are indicated together, the latter merely constituting a portion of the windings of the former.

Figure 2:
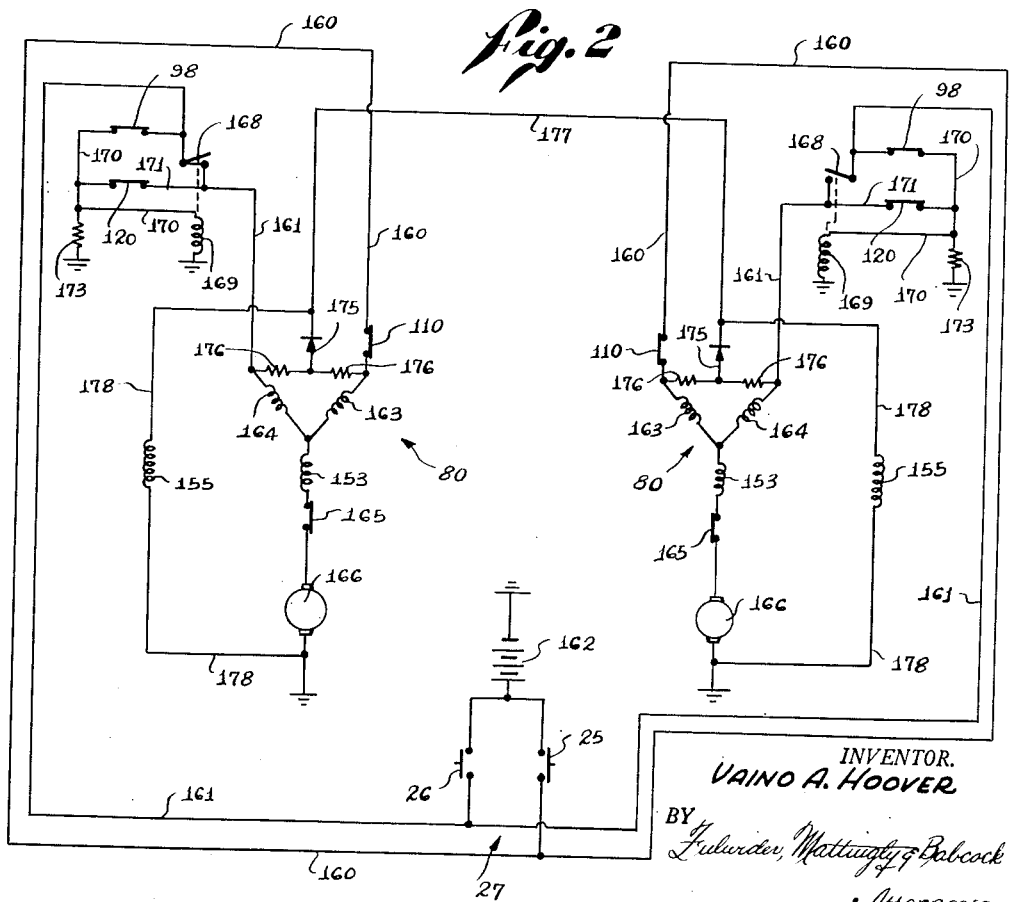
Fig. 2 is a wiring diagram of the electrical control circuit for a preferred form of paired actuators.

The electrical circuit connections indicated generally at 27 in Fig. 1 making possible the operation just described are best understood by considering Fig. 2. As shown therein, leads 160 and 161 extend from a source of D. C. power 162 through "extend" and "retract" control switches 25 and 26, respectively, to "extend" and "retract" series field windings 163 and 164 which are located in motor 80. The field windings 163 and 164 are interconnected and connected to one terminal of the main clutch coil 153, the other terminal thereof being connected through a thermal overload switch 165 to one terminal of a motor armature winding 166. The other terminal of the armature 166 is grounded, as is one terminal of the battery 162. Upon closing "extend" switch 25, current flows through lead 160 to winding 163 for driving the motor 80 in one direction, while closing "retract" switch 26 energizes winding 164 for driving the motor in the opposite direction.

The normally closed outer or "extend" limit switch 110 is connected in lead 160 to open the circuit to motor 80 when the outer limit of travel of screw 50 is reached. In the lead 161 connected to the "retract" winding 164 are connected normally open contacts 168 of a relay 169. The coil of relay 169 is connected between lead 161 on the line side of contacts 168 and ground by a conductor 170 and torque overload switch 98. Coil 169 is shunted by a loading resistance 173. Shunted across between lead 170 and lead 161 on the load side of contacts 168 is the load limit shorting switch 120.

By this arrangement it can be seen that when "retract" switch 26 is closed, coil 169 is energized through normally closed load-limiting switch 98 to close contacts 168 and energize the motor through the retract windings 164. Motor 80 drives screw 50 inwardly, and since switch 120 is closed until the inner limit of travel is approached, coil 169 will be energized even though the load switch 98 should open. Thus a torque overload during the retraction of screw 50 cannot deenergize motor 80 until the inner limit switch 120 has been opened. Once switch 120 has opened, the mechanical stops on screw 50 and nut 40 are about to engage and motor 80 is then under the exclusive control of load-limiting switch 98. Upon engagement of the mechanical stops, the torque load becomes greater than the maximum load setting of the load limit mechanism, and switch 98 is opened to deenergize coil 169 and motor 80.

For the purpose of energizing the auxiliary brake releasing coil 155 when the corresponding motor 80 has failed, I provide a cross-connection with the circuit of the opposite motor. At each of the motors 80, the leads 160 and 161 are interconnected by a pair of series connected resistances 176, and the common terminals of each pair of resistances 176 are interconnected through a pair of rectifiers 175 and a conductor 177 extending between the two rectifiers 175. The rectifiers 175 are arranged back-to-back to permit current flow from either of the leads 160 or 161 to the conductor 177, but prohibit reverse flow of current from conductor 177 to the field windings. A conductor 178 at each of the motors 80 connects the respective auxiliary brake release coil 155 between conductor 177 and ground. Accordingly, each coil 155 is energized at all times from the field windings of the opposite motor, but the rectifiers 175 prevent any cross-flow of current between the field windings.

If one motor 80, or the electrical supply thereto, has failed, that actuator 20 has the drive pinion 82 freed for rotation by the cross-energization of coil 155 to release disk 151 from brake 152. Since the gear trains are mechanically interconnected through pinions 126 and 127 and shaft 28, both screws 50 will be driven from the motor 80 of the other unit. I have thus provided a system in which both flaps must necessarily be moved together, and yet are each independently held against accidental movement.

In Figs. 8 through 11 I have shown a modified form of actuator 220 which is generally similar to the form just described, but has different control means. The purpose of the modified control means is to provide for the extension of the actuator screw to an intermediate position which is reached by operating a separate control switch. Thus for the type of installation previously described, the flaps 21 can be accurately stopped in a half-extended position, or in some other intermediate position determined by the setting of the control cams.

As is best seen in Fig. 8, the actuator 220 has a housing 221 in which is mounted a rotatable and axially immovable elongated nut 222. Engaged within nut 222 is an axially movable and non-rotatable screw 223 carrying on its outer end an attaching ear 224 which is linearly movable with respect to an opposite ear 225 secured to housing 221. The means for driving nut 222 are the same as those previously described, and include a motor 226 driving through a magnetic clutch and brake unit 227 to a reduction gear drive 228, which is in turn connected to the driving nut.

At the top of housing 221 are a pair of coupling receptacles 229 which have therein driving pinions adapted for connection with a flexible shaft to mechanically interconnect the driving nuts 222 of a pair of actuators in the manner previously described. Mechanical limit stops similar to those previously mentioned are also provided, and means for insuring full retraction of screw 223 against the inner stop, including a load-limiting mechanism 231 connected to a load limit switch 232. A load limit shorting switch 233 is connected across switch 232 so as to render the latter ineffective to deenergize motor 228. Shorting switch 233 has an actuating lever (not shown) which is positioned so as to be moved in a direction to open the electrical contacts of switch 233 when screw 223 has approached the inner limit of its travel. Thus load limit switch 232 is effective only when the inner mechanical stops are about to engage. As can be appreciated, the device thus far described has the same construction as the preferred actuator, and it is not necessary to repeat the details of operation thereof.

In order to actuate the limit switches, a ring cam means 234 is mounted on an outer covering tube 235 which is affixed for linear movement with screw 223. Cam means 234 has an outer longitudinally adjustable collar member 236 and an inner elongated tapered sleeve 237 which is fixed in position relative to tube 235. Collar 236 has an internally threaded tapered socket portion 238 that takes a split collet-like lock ring 239 permitting the collar 236 to be moved to any desired location on the tube 235 and there secured by the clamping of the lock ring 239 by relative rotation of the parts 238 and 239.

Mounted on the motor 226 is an "intermediate" limit switch 240 and an "extend" limit switch 241 that are normally closed in the motor circuit, and adapted to be opened by the cam means 234. When "intermediate" limit switch 240 is opened, screw 223 is stopped accurately at an intermediate position determined by the longitudinal adjustment of collar 236 with respect to tube 235, and when the "extend" switch 241 is opened the screw is stopped in a fully extended position.

To operate switches 240 and 241 I provide actuating arms 242 and 243, respectively, which are pivotally mounted adjacent switch plungers 244 and extend outwardly from the adjacent sides of the switches. Upon inward depression of plungers 244, electrical contacts within the switches are moved from a closed to an open position. The arms 242 and 243 each have wedge-shaped surfaces 245 lying in a plane at right-angles to the axis of movement of plungers 244 and provided with thicker trailing portions which depress the plungers upon pivotal movement thereof. As is viewed in Fig. 10, pivotal movement of arms 242 and 243 in a counterclockwise direction causes plungers 244 to be depressed.

Arm 242 is affixed to a tubular shaft 346 which is rotatably supported in a bracket 247 secured to the housing of motor 228, and arm 243 is affixed to a shaft 248 which extends concentrically through shaft 246 and is rotatable therein. Coil springs 250 and 251 are wound around shafts 246 and 248 and secured between a fixed abutment and arms 242 and 243 in such a manner as to urge counterclockwise pivotal movement (Fig. 10) thereof. Shaft 246 extends outwardly parallel to screw 223 and has fixed on its outer end an "intermediate" crank arm 254. Shaft 248 extends beyond crank arm 254 and has fixed on its outer end an "extend" crank arm 255. Both arms 254 and 255 project upwardly and carry on the free end thereof adjustable engagement screws 256 which lie in the path of movement of the cam means 235.

As is best seen in the enlarged detail of Fig. 11, the free end of "intermediate" crank arm 254 is spaced closer to the cover tube 236 than is arm 255, when both lie in their normal positions to which they are urged upwardly by springs 250 and 251. The cam collar 236 is of triangular section to provide a forward cam rise 258 which is adapted to engage "intermediate" crank 254 to pivot the same downwardly, but moves outwardly along a path, indicated in phantom line, that does not engage "extend" crank 255.

The tapered cam sleeve 237 which lies inwardly of collar 236 is of greater diameter than the collar and has formed thereon a cam rise 259 which is of a height sufficient to engage against the "extend" crank 255 and cause it to pivot downwardly. When crank 254 is pivoted downwardly, "intermediate" limit switch 240 is opened, and when crank 255 is pivoted downwardly, "extend" limit switch 241 is opened. Since the point of contact between crank 255 and cam rise 259 is spaced axially inwardly from the point of contact between cam rise 258 and crank 254, it can be seen that as screw 223 travels outwardly it causes switch 240 to be opened at an intermediate position of travel, and switch 241 to be opened in an extended position of travel. Thus switches 240 and 241 are properly actuated to control the movement of screw 223 to intermediate and extended positions. The location of the intermediate position may be adjusted within limits as desired merely by adjusting the location of the ring cam 236 on the tube 235, such adjustment being permitted by the collet-like construction above described.

The electrical circuit for controlling the operation of motor 226 is shown in Fig. 9. Motor 226 is of the split series field type having "extend" and "retract" field windings 260 and 261 each connected in series with the motor armature 262, one terminal of which is grounded as indicated at 263. Between field windings 260–261 and armature 262 is a thermal overload switch 264 and a clutch energizing coil 265. The clutch coil 265 and a brake releasing coil 266 are both part of the magnetic clutch and brake unit 227 which connects motor 226 with drive gearing 228. Unit 227 is of the same type found in the preferred form of actuator, and need not again be described in detail. Upon energization of coil 265 motor 226 is positively coupled to gearing 228, while upon energization of the auxiliary coil 266 the brake means holding gearing 228 against rotation are released.

Operation of the motor 226 is controlled by three control switches herein designated for convenience "extend" switch 270, "intermediate" switch 271, and "retract" switch 272. Like terminals of these three switches are connected together and to one terminal of a suitable source of D. C. power 268 as by a conductor 269, and the other power supply terminal is grounded as shown at 273.

Closing "extend" switch 270 connects power supply 268 and conductor 269 to an "extend" line 274 to thus energize the coil 278x of a relay 278, the coil 278x being connected between ground and a conductor 281 which is in turn connected to the "extend" line 274 by the normally closed contacts of the "extend" limit switch 241. Energization of relay coil 278x closes relay contacts 278a to connect conductor 281 to the "extend" field 260 of the motor 226 through conductor 279, thus energizing the motor 226 to drive the screw 223 toward the extended position. When the extended position is reached, "extend" limit switch 241 opens, deenergizing relay coil 278x and deenergizing motor 226 and clutch coil 265 with the resulting application of the brake to hold the apparatus in the extended position.

In a similar way, closing "intermediate" control switch 271 energizes an "intermediate" line 276 which is connected to the aforementioned conductor 281 through the normally closed contacts of the "intermediate" limit switch 240. In this way, the relay 278 is actuated and the motor 226 is operated in the extending direction until the operation is arrested by the opening of the "intermediate" limit switch 240 and the consequent deenergization of relay 278, motor 226 and clutch coil 265.

On the other hand, closing "retract" control switch 272 energizes a "retract" line 275 to thus energize the coil 284x of a relay 284, the coil 284x being connected between ground and a conductor 286 which is in turn connected to the "retract" line 275 by the normally closed contacts of the load limit switch 232. Energization of the relay coil 284x closes relay contacts 284a to connect the "retract" line 275 through conductor 285 to the "retract" field 261 of the motor 226, thus energizing the motor 226 to drive the screw 223 toward the retracted position.

Normally closed contacts of the "retract" limit switch 233 are connected between conductors 285 and 286 to short out the load limit switch 232 to render the latter ineffective to stop the operation of the motor 226 until the switch 233 is opened by close approach to the fully retracted position. When the mechanical stops are engaged at the fully retracted position, the load limit switch 232 opens, and, since the "retract" limit switch 233 is also open, deenergizes the relay 284, the motor 226, and the brake 265 so that the device is arrested and securely held in the fully retracted position.

The auxiliary brake release coil 266 is connected between ground and an "interlock" conductor 288 which is in turn connected to one end of a current limiting resistance 289. The other end of the resistance 289 is connected to a conductor 280 which is connected through normally open contacts 278b of the relay 278 to the aforementioned conductor 279, and through normally open contacts 284b of the relay 284 to the aforementioned conductor 285. In this way, the auxiliary coil 266 is energized whenever power is supplied to the motor 226, whether by operation of the relay 278 or by operation of the relay 284.

In Fig. 9 I have shown the circuit for only a single actuator 220, with leads 274a, 275a, and 276a joined to the conductors 274, 275, and 276, respectively, extending outwardly for connection to the circuit of a paired actuator. Again, as in the preferred actuator, the paired actuator units 220 are mechanically cross-connected so that both will be driven from the motor 226 of one actuator in the event of a failure of the other motor. To accomplish this it is necessary that the auxiliary brake releasing coil 266 of each actuator be energized through the circuit of the other actuator, in order to release the brake means holding the drive gearing 228 against rotation. This result is secured by the "interlock" conductor 288.

As was previously described, the "interlock" conductor 288 is connected to both of relays 278 and 284 so that voltage is applied thereto whenever either of the relays are closed to drive motor 226. This energizes coil 266 from the opposite actuator circuit, even though the motor 226 of the first actuator has failed. The purpose of resistances 289 is to cause sufficient voltage drop to prevent any substantial current flow through the field windings of the deenergized motor 226, while permitting energization of coils 266. By energizing coils 266 the drive gearing 228 is released so that both actuators 220 may be driven simultaneously.

In Figs. 12 to 19 I have illustrated another form of actuator 320 which is designed for a different purpose than the forms just described. The actuator 320 is advantageous for use in actuating an aircraft canopy, or the like, which is movable linearly to fully retracted or extended positions, and to an intermediate "parked" position. In an installation of this type it is also desirable that the thrust applied by the actuator be limited to a predetermined amount both during extension and retraction. For these reasons, the mechanical construction, and the control means of the actuator 320 differ considerably from that of the previously described actuators.

Actuator 320 has a housing 321 which forms a chamber 322 closed at one end by a cover 323. A plate 324 is removably secured in the upper portion of cover 323 by fastening means such as bolts 325, and projecting outwardly from the plate is an ear 326. This end of housing 321 is attached rigidly to a suitable fixed frame member by connection to ear 326. At the end of housing 321 opposite cover 323 is an elongated rectangular casing 327 which supports control means later to be described. Casing 327 has outer and inner end openings 328 and 329, respectively, and the latter registers with an end opening 330 formed in housing 321.

An elongated tubular nut 332 is extended outwardly from housing 321 through opening 330, and passes through cover 327 with substantial clearance to openings 328 and 329. Nut 332 is rotatably supported in housing 321 by a main ball bearing 333 and a smaller end bearing 334. Extending coaxially within nut 332 is an elongated externally threaded screw 336 which is threadedly engaged with an internally threaded nut end portion 337. The remaining interior portion of nut 332 is of enlarged diameter forming a smooth-walled bore 338 which has substantial clearance with screw 336.

At the outer end of screw 336 a sleeve 340 is engaged thereon, and attached to a thin-walled tubular cover 341 which slidably covers nut 332, and slidably passes through openings 328 and 329. Secured threadedly to the outer end of sleeve 340 is a head 342 which is locked adjustably against rotation by a key 343. Head 342 projects outwardly and carries an ear 344 that is aligned with the opposite end ear 326 and is linearly movable with respect thereto. Ear 326 is adapted to be secured to a suitable driving linkage (not shown), the nature of which is such as to hold the ear, and in turn, screw 336 against rotation. Therefore, upon rotation of nut 332, screw 336 will be extended or retracted relative thereto, to provide the desired linear actuation.

In order to rotate nut 332 I provide a reversible electric motor 346 which is mounted on the bottom portion of housing 321. Motor 346 is connected to a driving pinion 347 through a magnetic clutch and brake unit 348 of the type previously described. Pinion 347 is located within the bottom of housing chamber 322, and is meshed with a spur gear 250 affixed to a shaft 351 that is formed with a pinion 352. Shaft 351 is rotatably supported by end bearings 353, mounted rigidly in housing 321 and cover 323, and is held against axial movement.

Near the inner end of nut 332 adjacent bearing 333, a spur gear 355 is keyed for rotation with the nut and is meshed with pinion 352. It should be noted that the width of pinion 352 is substantially greater than that of gear 355 so that the latter may slide axially while remaining in driving mesh with the pinion. By reason of the drive gearing just described, rotation of motor 346 causes rotation of nut 332 in accordance with the direction of rotation of the motor, to extend or retract screw 336.

In order to limit the thrust exerted by screw 336 during both extension and retraction, I support nut 332 for limited axial movement, and center it between opposed sets of spring means which are yieldable when a predetermined thrust load has been reached. The resulting axial movement of nut 332 is used to open load limit switches for deenergizing motor 346. To accomplish this result, the outer race of bearing 333 is slidably mounted in a cup-shaped seat 258 secured adjacent housing opening 330, and the inner race is secured rigidly to nut 332. Threadedly engaged in the end of nut 332 is a flanged cap 359 which locks the inner race of bearing 334 rigidly to nut 332, while the outer race is slidably seated in a ring 360.

Ring 360 forms a part of a load-limiting mechanism which is formed as a sub-assembly supported on end plate 324. A fixed flanged portion 361 projects inwardly from plate 324 and forms a shallow seat for the outer portion of ring 360. The inner portion of ring 360 is held within a similar shallow seat formed in a retaining member 362 which is secured to flanged portion 361 by the bolts 325. Ring 360 is thus held firmly against axial movement, and has a portion of its side faces projecting radially inwardly beyond the seat portions of flange 361 and retainer 362.

At both sides of ring 360 and bearing 334 sets of conically tapered washer-like springs 364 are mounted within flange 361 and retainer 362. Each set of springs 364 comprises a pair mounted in opposed tapered relationship, and held against outward movement by engagement with flange 361 and retainer 362. The exposed side faces of ring 360 act as stops limiting the inward movement of springs 364, which are pre-loaded by pulling retainer 362 toward flange 361 through bolts 325.

As the outer race of bearing 334 moves slidably in either direction it compresses one set of springs 364, so that axial movement of nut 332 may only occur when the thrust loading thereon exceeds the predetermined force exerted by the springs. When the thrust load does exceed the predetermined limit, axial movement of nut 332 causes axial movement of the outer race of bearing 333, and this motion is utilized to open left and right hand load limit switches 366 and 367 which are mounted on the housing of motor 346.

Switches 366 and 367 are mounted in side-by-side spaced relationship and have opposed operating plungers 368 and 369, respectively, extending outwardly from the adjacent side faces. Both switches 366 and 367 are normally closed switches connected into the circuit of motor 346, and are operable to open internal electrical contacts upon depression of plungers 368 and 369 so as to deenergize the motor. Between buttons 368 and 369 is an actuating arm 370 which moves pivotally from side to side to depress one or the other of the switch buttons.

As is best seen in Fig. 14, arm 370 is pinned to a vertical shaft 371 which is rotatably supported in a bifurcated bracket 372 secured rigidly to the housing structure. Affixed to the upper end of shaft 371 is a short crank arm 373 which extends outwardly parallel to arm 370. A spring 374 is wound around shaft 371 and secured between arm 370 and bracket 372 so as to urge pivotal movement of the arm to the left as viewed in Fig. 12, or in a direction to depress plunger 368.

A slidable plunger or arm 375 is mounted in housing 321 and has an inner end which extends inwardly to bear against the bottom of the outer race of bearing 333. The outer end of plunger 375 is threadedly engaged in crank arm 373 so as to be linearly adjustable with respect thereto. Because of the action of spring 374, plunger 375 is urged to bear firmly against the race of bearing 333 and is thus slidably movable therewith, in accordance with the axial movement of nut 332.

If during the extension of screw 336 the thrust load becomes excessive, the left-hand set of springs 364 yields, and nut 332 and bearing 333 slide to the left within housing 321. Plunger 375 follows bearing 333 under the urging of spring 375 and pivots crank 373. Movement of crank 373 in this direction causes arm 370 to depress plunger 368 and open the contacts of switch 366. As can thus be seen, switch 366 may be considered the "extend" load limit switch.

If during the retraction of screw 336 the thrust load becomes excessive, the right-hand set of springs 364 yields and nut 332 and bearing 333 slide to the right. Plunger 375 is driven to the right and pivots crank 373 in the opposite direction. Arm 370 then pivots in a direction to depress plunger 369 and open the contacts of switch 367, which may therefore be considered the "retract" load limit switch.

While the mechanical stops for limiting the travel of screw 336 are the same previously described for the preferred form of actuator, and therefore need not be again considered, the arrangement of electrical limit switches for controlling the operation of motor 346 is somewhat different. As will be remembered, this present actuator has in addition to a retracted and extended position, an intermediate or parked position. Because the parked position may be approached from either the extended or retracted position, I provide four limit switches which are mounted above screw 336 in cover 327, and are designated "retract" limit switch 380, "retract-to-park" limit switch 381, "extend-to-park" limit switch 382, and "extend" limit switch 383. Switches 380—383 are mounted between a pair of end brackets 384, and have dependent operating plungers 385 to 388, respectively. All of the switches 380—383 are normally closed switches, and are operable upon raising of their respective operating plungers 385—388, to open internal electrical contacts.

Secured to the tubular cover 341 for movement with screw 336 is a ring cam 389, which is shown in Fig. 12 as in a fully retracted position. At the left and right ends of cover 327 are cam followers 390 and 391, respectively, which are pivotally mounted upon horizontal pins 392 (Fig. 14) for movement upwardly from a normal substantially horizontal position. Each of the followers 390 and 391 has a raised toe portion 393 which is adapted to be lifted upwardly by cam 389. The follower 390 has three operating positions as indicated in the detail in Fig. 19.

Before the cam 389 has passed under follower 390, the follower lies in the lower position as indicated in the phantom outline 390a. When cam 389 has passed by toe 393, follower 390 is raised to the position shown in solid outline, and when the cam has moved further to the left, the follower is raised fully to the position shown in the phantom outline 390b. The opposite follower 391 raises in the same manner, but merely has two operating positions, as shown in Fig. 12, the lower position shown in solid outline, and the fully raised position shown in phantom outline.

Extending through brackets 384 beneath switches 380—383 is a rotatable shaft 394 that has a reduced outer end portion. Extending inwardly from the outer end of shaft 394 is a coaxial shaft 395 which fits over the reduced end portion of the latter and is independently rotatable. Fitted outboard of right-hand bracket 384, and affixed securely to shaft 395, is a sleeve carrying a rearwardly extending crank arm 396, as is seen in Fig. 14. A similar sleeve and crank arm 397 is secured to shaft 394 outboard of the left-hand bracket 384. Shaft 394 extends beneath all of the switches 380—382, while shaft 385 is shorter and extends only beneath switch 383.

Spaced along shaft 394 directly beneath each of the operating plungers 385 to 387 are switch operating cams 400 to 402, respectively, which are keyed for rotation with the shaft. Keyed to the shaft 385 directly beneath operating plunger 388 is a single switch operating cam 403.

When ring cam 389 is located between the followers 390 and 391, the followers seat downwardly against the surface of tube 341, as indicated in the end view of Fig. 14. When cam 389 is moved in the extending direction and approaches the fully extended position, cam 389 rides beneath follower 391 and raises the free end of the follower and pivotally raises crank arm 396 which is seated downwardly thereon. Pivotal movement of arm 396 causes pivotal movement of shaft 395 and cam 403. As is seen in Fig. 18, the cam 403 has a cam rise 404 which is adapted to raise operating plunger 388 upon rotation to a position thereunder. The angular rotation of cam 403 from the normal to the operating position is indicated by the directional arrow. Upon elevation of plunger 388, the internal contacts within "extend" switch 383 are opened to mark the fully extended position of screw 336.

When cam 389 lies outwardly of follower 390, the latter lies horizontally with crank arm 397 seated thereon. As follower 390 is lifted, the crank 397 is pivoted upwardly to rotate the shaft 394 and cams 400 to 402. The cams 400 to 402 have cam rises 405 to 407, respectively, thereon which are adapted to raise the switch-operating plungers 385 to 387, as is indicated in the diagrammatic views Figs. 15 through 17. The position of cams 400 to 402 as seen in Figs. 15 to 17 is the position in which follower 390 is fully raised, corresponding to the position 390b shown in Fig. 19. The angular rotation of cams 400 to 402 from the position shown through the position in which follower 390 is partially raised and then horizontally extended, is indicated by the directional arrows.

When follower 390 is fully raised, cam rise 405 lifts plunger 385 to open "retract" switch 380 and thus mark the fully retracted position of screw 336. In this position the "retract-to-park" switch 381 is closed, and the cam rise 406 lies counterclockwise of operating plunger 386 as seen in Fig. 16. As follower 390 is lowered to the position in which cam 389 lies adjacent toe 393, cam rise 406 rides in a clockwise direction to raise plunger 386 and open switch 381. Thus, when screw 336 is traveling from the retracted to the parked position, the opening of switch 381 marks the parked position of the screw 336 when that position is approached from the fully retracted position.

The operation of the "extend-to-park" switch 382 and the cam 402 is indicated in Fig. 17. When screw 336 is fully extended, the follower 390 occupies its lowermost position, and cam 402 is in a corresponding position rotated counterclockwise from that shown in Fig. 17 by the full amount of angular rotation indicated by the long arrow. As screw 336 travels toward the parked position from the extended position, cam 389 passes beneath the toe 393, and when the parked position is reached, cam 389 lies just inwardly of the toe in the position shown in solid outline in Fig. 19. The resulting lifting of follower 390 to the position shown in solid line in Fig. 19 causes the cam 402 to be rotated counterclockwise through an amount indicated by the short directional arrow, to thus raise the plunger 387 and open switch 382. Operation of "extend-to-park" switch 382 marks the parked position of screw 336 when it is moved from the extended position to the parked position.

For controlling the operation of motor 346 I provide control switches which are designated as an "extend" control switch 410, a "retract" control switch 411, an "extend-to-park" control switch 412, and a "retract-to-park" control switch 413. As is seen in the electrical circuit (Fig. 13), switches 410–413 are each connected to one side of a D. C. power supply 414 by a conductor 415, the other side of the power supply being connected to ground as shown at 416. Motor 346 is of the D. C. split series field type having "extend" and "retract" field windings 417 and 418, respectively, connected in series with an armature 419 and thence to ground 416. Between the field windings 417, 418 and coil 419 is a thermal overload switch 420 and a clutch coil 421 which is adapted to energize the magnetic clutch and brake unit 348. When clutch coil 421 is deenergized, driving pinion 347 is held against rotation, and when the clutch coil is energized, the pinion is coupled for rotation with motor 346 in the manner previously described for the preferred actuator.

Extending from the "extend" switch 410 to the "extend" winding 417 is a conductor 422, while a similar conductor 423 joins the "retract" switch 411 with the "retract" winding 418. The "extend" load limit switch 366, and the "extend" travel limit switch 383 are connected in series in conductor 422, and the "retract" load and "retract" travel limit switches 367 and 380 are connected in series in conductor 423. Upon closing "extend" switch 410, the motor 346 is energized through "extend" winding 417 to extend screw 336. If the thrust load limit is exceeded during the extension of screw 336, load limit switch 366 opens to deenergize motor 346. When the outer limit of travel is reached, switch 383 opens to deenergize motor 346, and stop screw 336 in the extended position.

Upon closing "retract" switch 411, motor 346 is energized through the "retract" field 418 to drive screw 336 in a retracting direction. An excessive thrust load during the retracting travel opens load limit switch 367 to deenergize motor 346. When the inner limit of travel is reached, retract limit switch 380, which is normally closed, opens to deenergize motor 346 and stop screw 336 in the retracted position. In Fig. 13, switch 380 is shown in the open position in correspondence to the mechanical position of the elements shown in Fig. 12. It can therefore be appreciated that by closing the "extend" or "retract" switches 410 and 411 I am able to drive screw 336 to the extended or retracted positions, respectively.

When it is desired to drive screw 336 from the extended to the parked position, switch 412 is closed. Since the movement desired is in a retracting direction, switch 412 is connected to "retract" winding 418 by a conductor 425 which joins conductor 423 ahead of limit switches 380 and 367, and which includes the normally closed "extend-to-park" limit switch 382. As switch 382 opens, motor 346 is deenergized and screw 336 is stopped in the parked position. If during the travel of screw 336 to the parked position an excessive thrust load occurs, load switch 367 is operable to stop the travel of the screw.

To drive screw 336 from the retracted to the parked position, switch 413 is closed. Since the desired movement is in an extending direction, switch 413 is connected to "extend" winding 417 by a conductor 426 which joins conductor 422 ahead of limit switches 366 and 383, and which includes the normally closed "retract-to-park" limit switch 381. Opening of switch 381 deenergizes motor 346 to stop screw 336 in the parked position. If the thrust load becomes excessive during the travel to the parked position, load switch 366 opens to stop the travel of screw 336. By the operation of switches 412 and 413 I am therefore able to move screw 336 from either the extended or retracted positions to the intermediate parked position.

While I have shown and described specific embodiments of my invention which are particularly adapted to meet the requirements of the specific applications described, it will be understood that various of the components and their respective functions may be combined in different ways than are herein specifically set forth. Therefore, my invention is not to be restricted to the foregoing details of construction, except as defined in the appended claims.

I claim:

1. A linear actuator which includes: a driving member; a driven member; a motor connected to said driving member; a mechanical stop limiting the travel of said driven member; an electrical limit switch connected to said motor for controlling same and adapted to be engaged by said driven member before the latter reaches said mechanical stop; a load limit mechanism connected to said driving member and operable in response to a predetermined load on said driving member to stop the driving movement thereof; and means rendering said load limit mechanism ineffective until said driven member has passed said limit switch in a direction to approach said mechanical stop.

2. A linear actuator which includes: a rotatable driving nut; a non-rotatable linearly movable driven screw; a motor connected to said driving nut for rotating the same; a mechanical limit stop limiting the travel of said screw in one direction; a load limit mechanism connected to said nut and including a load limit switch actuated by movement of said screw toward said mechanical stop under an excess load to move from a normally closed to an open position; a load limit shorting switch actuated by movement of said screw to a position just short of engagement with said stop to move from a normally closed to open position; and a circuit connecting said load switch and said shorting switch to said motor for keeping said motor energized until said screw has engaged said mechanical stop to open said load switch.

3. A linear actuator which includes: a rotatable driving nut; a non-rotatable linearly movable driven screw; a reversible motor connected to said nut for rotating said nut; a mechanical limit stop limiting the retraction of said screw; an adjustable load limit mechanism having an axially slidable gear connected to said nut and spring means urging said gear against axial movement, said gear sliding axially to compress said spring means when said nut is rotated in a retracting direction against an excess load; a load limit switch connected to said limit mechanism and actuated by sliding movement of said pinion to move from a normally closed to open position; a load limit shorting switch actuated by movement of said screw to a position just short of engagement with said stop to move from a normally closed to open position; and a circuit connecting said load switch and said shorting switch to said motor for keeping said motor energized until said shorting switch has been opened and said screw has engaged said mechanical stop to open said load switch.

4. A linear actuator which includes: a rotatable driving nut; a non-rotatable linearly movable driven screw; a reversible motor connected to said nut for rotating said nut; a mechanical limit stop limiting the retraction of said screw; an adjustable load limit mechanism having an axially slidable gear connected to said nut and a main spring normally spaced from said gear and yieldable under an excess load when said gear is moved axially thereagainst by rotation of said nut in a retracting direction, said mechanism including a reset spring urging said gear to the position spaced from said main spring; a load limit switch connected to said limit mechanism and actuated by movement of said gear against said main spring to move from a normally closed to open position, and being returned to said closed position by movement of said gear by said reset spring when said load is reduced; a load limit shorting switch actuated by movement of said screw to a position just short of engagement with said stop to move from a normally closed to open position; and a circuit connecting said load switch and said shorting switch to said motor for keeping said motor energized until said shorting switch has been opened and said screw has engaged said mechanical stop to open said load switch.

5. A linear actuator which includes: a housing having connecting means for holding said housing against movement; a female threaded rotatable and axially immovable driving nut mounted in said housing; a male threaded non-rotatable driven screw engaging said nut and axially movable with respect thereto; connecting means attached to said screw opposite said first-mentioned connecting means, and adapted to be connected to a load to be moved by said actuator; mechanical limit stops on said nut and said screw engaging to hold said nut against rotation in one direction relative to said screw when said screw has reached one limit of axial travel, and engaging to hold said nut against rotation in the opposite direction relative to said screw when said screw has reached the other limit of its axial travel; a reversible motor connected to said nut for rotating said nut; an adjustable load limit mechanism having an axially slidable helical pinion gear meshed with a cooperating helical gear connected to said nut and spring means urging said pinion against axial movement, said pinion sliding axially to compress said spring means when said nut is rotated in a retracting direction against an excess load; a load limit switch connected to said limit mechanism and actuated by sliding movement of said pinion to move from a normally closed to open position; a load limit shorting switch actuated by movement of said screw to a position just short of engagement with the mechanical stop that limits the retraction of said screw, to move from a normally closed to open position; and a circuit connecting said load switch and said shorting switch to said motor for energizing said motor when said load switch is closed and keeping said motor energized until said shorting switch has been opened and said screw has engaged said last-mentioned mechanical stop to open said load switch.

6. A linear actuator which includes: a housing having connecting means for holding said housing against movement; a female threaded rotatable and axially immovable driving nut mounted in said housing; a male threaded non-rotatable driven screw engaging said nut and axially movable with respect thereto; connecting means attached to said screw opposite said first-mentioned connecting means, and adapted to be connected to a load to be moved by said actuator; mechanical limit stops on said nut and said screw engaging to hold said nut against rotation in one direction relative to said screw when said screw has reached one limit of axial travel, and engaging to hold said nut against rotation in the opposite direction relative to said screw when said screw has reached the other limit of its axial travel; a reversible motor connected to said nut for rotating said nut; an adjustable load limit mechanism having an axially slidable helical pinion meshed with a cooperating gear connected to said nut and a main spring normally spaced from said pinion and yieldable under an excess load when said pinion is moved axially thereagainst by rotation of said nut in a retracting direction, said mechanism including a reset spring urging said pinion to the position spaced from said main spring; a load limit switch connected to said limit mechanism and actuated by movement of said pinion against said main spring to move from a normally closed to open position, and being returned to said closed position by movement of said pinion by said reset spring when said load is reduced; a load limit shorting switch actuated by movement of said screw to a position just short of engagement with the mechanical stop that limits the retraction of said screw, to move from a normally closed to open position; and a circuit connecting said load switch and said shorting switch to said motor for energizing said motor when said load switch is closed and keeping said motor energized until said shorting switch has been opened and said screw has engaged said last-mentioned mechanical stop to open said load switch.

7. A linear actuator which includes: a rotatable driving nut; a non-rotatable linearly movable driven screw; a motor connected to said driving nut for rotating the same; a mechanical limit stop limiting the travel of said screw in one direction; an electrical limit switch connected to said motor for controlling same and adapted to be engaged by said screw before the latter reaches said mechanical limit stop; a load limit mechanism connected to said nut and operable in response to a predetermined load thereon to stop the rotation thereof; and means rendering said load limit mechanism ineffective until said screw has passed said limit switch in a direction to approach said mechanical stop.

8. In a mechanical actuator having an electric motor, a rotatable driving nut operated by said motor, a non-rotatable axially movable driven screw meshed with said driving nut, and a mechanical stop limiting retraction of said screw, control means comprising: an adjustable load limit mechanism which includes an axially slidable helical pinion, a cooperating helical gear meshed with said pinion and connected to said driving nut and spring means urging said pinion against axial movement, said pinion sliding axially to compress said spring means when said nut is rotated in a retracting direction against an excess load; a load limit switch connected to said limit mechanism and actuated by sliding movement of said pinion to move from a normally closed to an open position; a load limit shorting switch actuated by movement of said screw to a position just short of engagement with said mechanical stop to move from a normally closed to an open position; a circuit connecting said load limit switch and said load limit shorting switch to said motor for keeping said motor energized until said load limit shorting switch has been opened and said screw has engaged said mechanical stop to open said load limit switch; and an extend limit switch connected to said motor for de-energizing said motor when said screw is fully extended.

9. In a mechanical actuator having an electric motor, a rotatable driving nut operated by said motor, a non-rotatable axially movable driven screw meshed with said driving nut, and a mechanical stop limiting retraction of said screw, control means comprising: an adjustable load limit mechanism which includes an axially slidable helical pinion, a cooperating helical gear meshed with said pinion and connected to said driving nut and a main spring normally spaced from said gear and yieldable under an excess load when said pinion is moved axially thereagainst by rotation of said nut in a retracting direction, said mechanism including a reset spring urging said pinion to a position spaced from said main spring; a load limit switch connected to said limit mechanism and actuated by movement of said pinion against said main spring to move from a normally closed to an open position, and being returned to said closed position by movement of said pinon by said reset spring when said load is reduced; a load limit shorting switch actuated by movement of said screw to a position just short of engagement with said mechanical stop limiting retraction thereof to move from a normally closed to an open position; a circuit connecting said load switch and said shorting switch to said motor for keeping said motor energized until said shorting switch has been opened and said screw has engaged said mechanical stop to open said load switch; and an extend limit switch connected to said motor for de-energizing said motor when said screw is fully extended.

References Cited in the file of this patent
UNITED STATES PATENTS

| | | |
|---|---|---|
| 1,508,770 | Blood | Sept. 16, 1924 |
| 2,259,437 | Dean | Oct. 21, 1941 |
| 2,407,537 | Chapman | Sept. 10, 1946 |
| 2,410,695 | Werner | Nov. 5, 1946 |
| 2,418,351 | Jackson | Apr. 1, 1947 |
| 2,422,495 | Morrow | June 17, 1947 |
| 2,481,028 | Lear | Sept. 6, 1949 |
| 2,500,691 | Lear | Mar. 14, 1950 |
| 2,530,930 | Albert | Nov. 21, 1950 |
| 2,531,109 | Chapman | Nov. 21, 1950 |
| 2,569,542 | Skidmore et al. | Oct. 2, 1951 |
| 2,590,251 | Hoover | Mar. 25, 1952 |